June 1, 1965     D. E. BEACH     3,186,322
FILM TRANSPORT AND METERING MECHANISM FOR CAMERAS
Filed Feb. 25, 1963     4 Sheets-Sheet 1
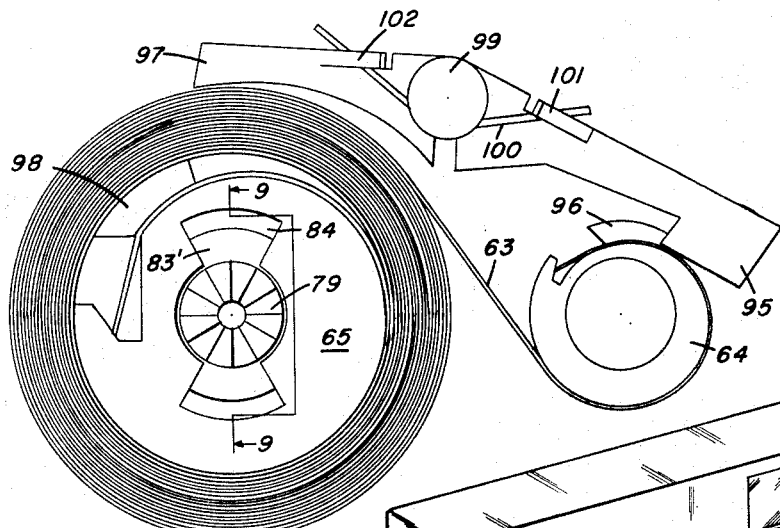
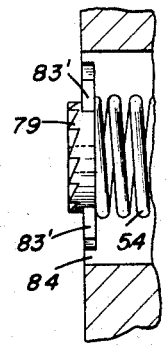
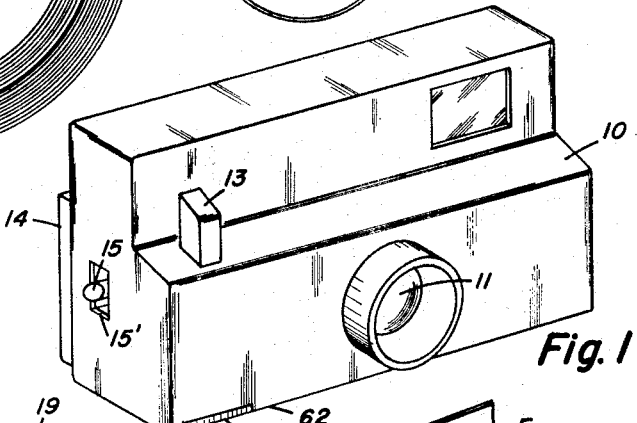
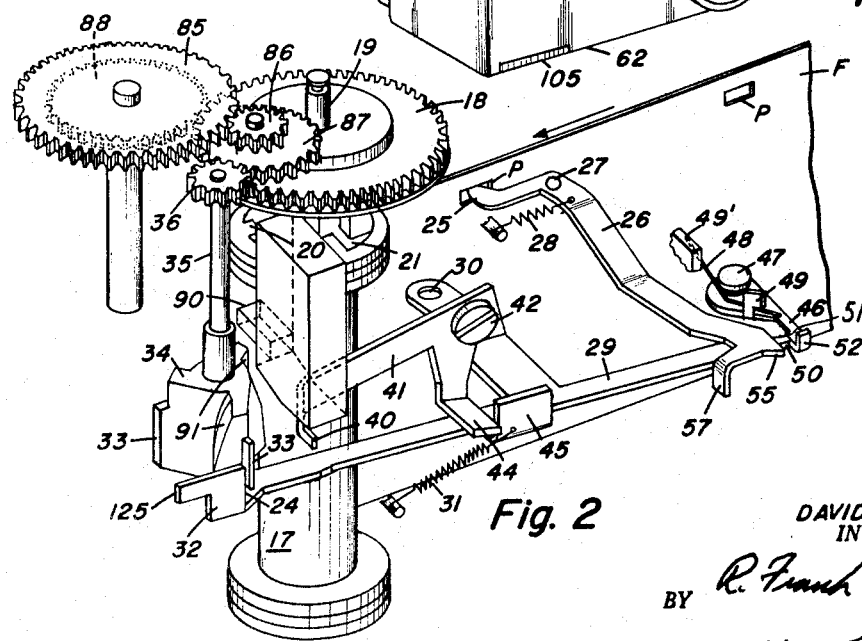
DAVID E. BEACH
INVENTOR.
BY
ATTORNEYS June 1, 1965  D. E. BEACH  3,186,322
FILM TRANSPORT AND METERING MECHANISM FOR CAMERAS
Filed Feb. 25, 1963  4 Sheets-Sheet 2

DAVID E. BEACH
INVENTOR.

BY
ATTORNEYS

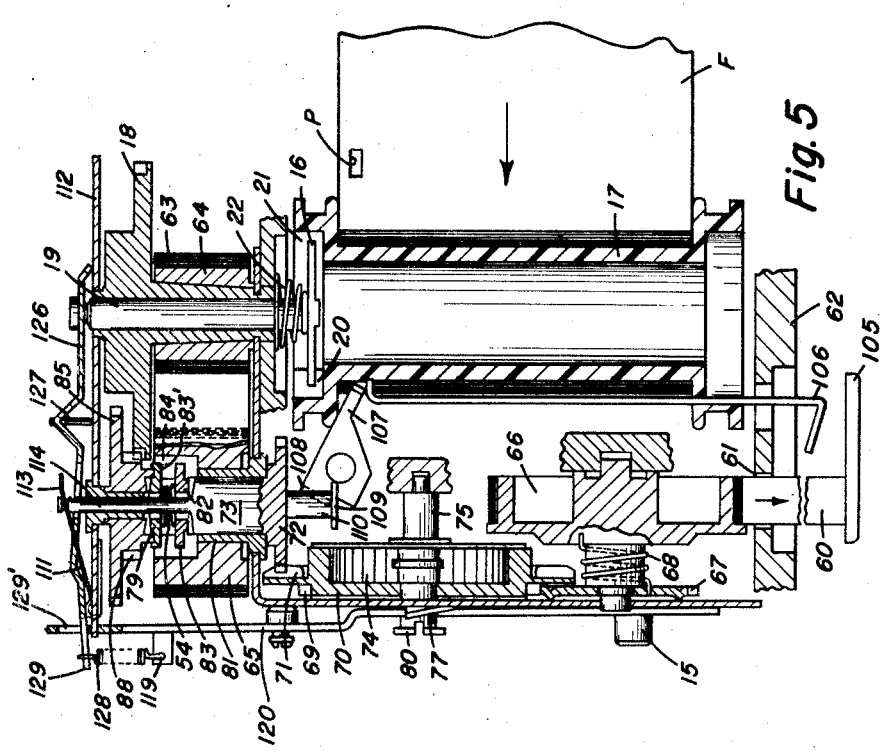

DAVID E. BEACH
INVENTOR.

ATTORNEYS

3,186,322
FILM TRANSPORT AND METERING MECHANISM FOR CAMERAS

David E. Beach, Rochester, N.Y., assignor to Eastman Kodak Company, Rochester, N.Y., a corporation of New Jersey
Filed Feb. 25, 1963, Ser. No. 260,628
13 Claims. (Cl. 95—31)

This invention relates to devices for transporting and metering film in roll film cameras, and more particularly, relates to such devices used in conjunction with roll film that is perforated at predetermined intervals.

Devices for metering the advance of roll film across the exposure plane of a camera by arresting the film advancing mechanism in response to the sensing of perforations or notches precut in the film at regular intervals are old and well known in the photographic art. Generally, however, such devices have not been wholly satisfactory due to one or more of the following concomitant problems: too much strain placed on the film, causing scratching or tearing of the film and, more often, causing distortion of the film plane; insufficient braking or locking force resulting in a failure of positive arresting action permitting overdriving of film by the operator; metering failure caused by insufficient perforation-sensor travel and/or need for edge of the film engaged perforation to drive the mechanism to a locking position; and the ability to fool the metering mechanism if the film is advanced too rapidly.

The present invention provides a simple and economic assembly which overcomes all of the above listed shortcomings of the prior art. Essentially, the present invention utilizes a sensing member which is held against a surface of the film under a relatively light pressure. When the sensing member drops into a film perforation or notch, this movement of the sensing member allows an independently biased locking lever to move into locking engagement with a member forming a part of the camera film transport mechanism. It is emphasized that no movement of the sensing member by the film is required to initiate the locking of the film transport mechanism as in most prior art systems, hence the film is put under no longitudinal strain. Movement of the locking lever also frees the camera shutter release lever, permitting the exposure of the film by the operator. Following the making of an exposure, the locking lever is automatically driven back to its cocked position by operation of the shutter release and in which position it is positively latched. Now the film can be advanced and the first part of the film advancing movement cams the sensing pawl out of engagement with the perforation and it then rides on the surface of the film to sense the next perforation and again stop the film transport mechanism as described. When the sensing member is cammed out of a film perforation, it releases the latch for the locking lever whereupon said lever drops back under control of the sensing member.

In order to prevent the film transport mechanism from being operated so rapidly that the described metering mechanism might be fooled, a governor assembly is incorporated in the film transport mechanism to limit the speed at which the film can be advanced regardless of how fast the operator, or other powered prime mover, might tend to operate the transport mechanism. This governor assembly is particularly useful in combination with a film transport mechanism having a spring motor drive as is the case in the preferred embodiment of the present invention. The spring motor is of such size that one winding thereof is generally sufficient to advance a complete roll of film. The spring motor is wound by repeatedly pulling on a spring retractable tape accessible from the bottom of the camera, and after the motor is wound and the pull tape is allowed to return to its fully retracted position the spring motor is automatically disconnected from the windup tape and its associated mechanism.

The locking lever of the metering mechanism obstructs rotation of a member of the governor assembly to stop the spring motor so that no force is applied to the film itself. To permit the locking lever to be readily removed from engagement with the governor assembly without putting too much resistance on the movement of the shutter release, during the first part of the movement of the shutter release in making an exposure, and before the shutter release frees the locking lever from engagement with the governor assembly, a part on the shutter release backs up the governor assembly slightly to remove the spring tension from the same and thus allow the locking lever to be readily freed from engagement therewith. The connection between the spring motor and its windup mechanism is such that during the windup of the film leader, and until the first perforation is sensed, the film and leader are advanced as the pull tape is operated. Winding of the motor does not readily start to take effect until the film transport is locked by the sensing member engaging the first metering perforation in the film. To permit the spring motor to run down at the end of the exposure of each roll of film, and/or to permit a new film to be loaded into the camera without putting an excessive load on the leader by the sensing member, means is provided for selectively disengaging the locking lever from the governor assembly and latching it out at the time the camera back latch is operated to open the camera for removal of an exposed roll of film.

It is an object of this invention to provide a new and improved mechanism for transporting and metering film in a roll film camera utilizing film which has been perforated or notched at predetermined intervals.

Another object is to provide a device for metering roll film by utilizing the sensing of film perforations to positively block the camera winding mechanism without submitting the film to any longitudinal strain whatsoever.

Still another object is to provide the film transport mechanism with a spring motor drive one winding of which will feed a complete roll of film through the camera.

Yet another object is to provide means for winding said spring motor which includes a spring retractable pull tape which will be automatically disconnected from the spring motor when it is allowed to return to its fully retracted position after winding off the leader strip of the film and winding up the spring motor.

A further object is to provide the film transport mechanism with a governor assembly for limiting the speed of film advance to a value to which the metering mechanism cannot be fooled, and to associate the locking member of the metering mechanism with this governor assembly in such a way that the transport mechanism can be readily stopped without putting any undue load on the metering mechanism or any load whatsoever on the film itself.

A still further object is to provide a film transport and metering mechanism of the type described which allows the locking member of the metering mechanism to be moved in order to release said spring motor so that it can run down upon the completion of the exposure of a roll of film. Preferably, the locking member of the metering mechanism is combined with the latch of the camera back so that when the latch is moved to open the camera back for removing the exposed roll of film the film transport mechanism is freed to allow the spring motor to run down.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawings, in which:

FIG. 1 illustrates, on a reduced scale, a simple roll film camera of the type that may incorporate the film transport and metering mechanism constructed in accordance with a preferred embodiment of the present invention;

FIGS. 2 to 4 are simplified perspective views, omitting all camera parts not essential to an understanding of the present invention, showing my novel metering mechanism in three sequential relative positions during the operation of the mechanism in the manner claimed and described;

FIG. 5 is an enlarged vertical sectional view taken through the take-up end of the camera and showing the complete film transport mechanism constructed in accordance with a preferred embodiment of the present invention;

FIG. 8 is an enlarged elevational detail of the spring motor showing one of the clutch members associated therewith and the means for limiting the winding and unwinding of the motor; and FIG. 9 is a sectional detail taken substantially on line 9—9 of FIG. 8.

Figure 3:
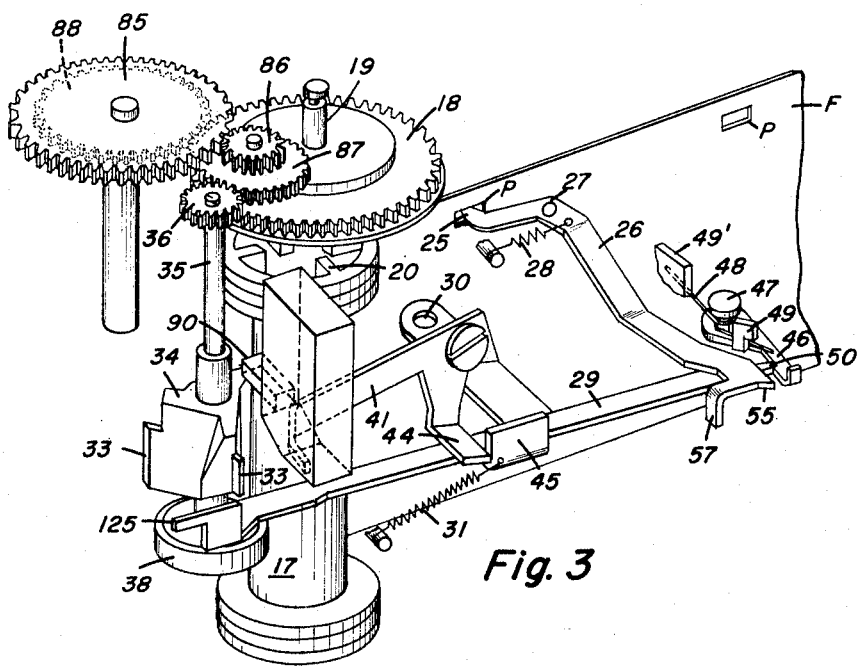

Referring now to FIG. 1, camera 10 is a typical simple camera in which roll film is selectively exposed by light entering the camera through a lens 11 when it is advanced across an exposure aperture or frame located in the focal plane of the lens. As is well known, exposure of the film is effected by means of any conventional shutter, not shown, which when actuated opens and closes in a given time interval to let light entering the lens to pass through a small aperture and to the focal plane of the camera. The shutter can be actuated by a shutter release 13 which when depressed from the normally raised position shown will trip or actuate the shutter, and which when released will return to the raised position shown under the action of a suitable spring mechanism, not shown, which may or may not, form a part of the shutter per se.

The camera has a hinged back 14 which can be opened by depressing latch button 15 extending through a slot 15' in the end wall of the camera body to operate a back latch mechanism to be later described. When the camera back is opened, a new roll of film F may be loaded into the camera or an exposed roll of film may be removed therefrom. The roll film F used in this camera is provided with metering perforations P which have been punched through the roll film at predetermined metering intervals. Preferably, the roll film used in this camera may be provided with a backing paper which is also perforated as disclosed in U.S. patent application Serial No. 834,751, Eagle et al., filed August 19, 1959, now U.S. Patent 3,086,862, said backing paper providing a paper leader strip which can be attached to a take-up spool 17 which is rotated by the film transport mechanism to pull the film across the focal plane of the camera from a supply spool or coil, not shown, in which form the film comes. As is well known, with paper backed roll film there is usually a paper trailer strip on the film which must be pulled onto the take-up spool after the last film area has been exposed, said trailer strip serving to protect the film on the take-up spool from light fog when it is removed from the camera.

After a roll film is loaded into the camera, the end of the leader strip is attached to the take-up spool 17 in any known manner, the take-up spool is rotated in a counterclockwise direction to advance the film F in the direction of the arrow. For rotating the take-up spool a drive gear 18 is provided which is keyed to an axially movable shaft 19 on the end of which is attached a clutch member or key 16 adapted to engage a corresponding clutch member 20 formed in the recess 21 in the end flange of the take-up spool, see FIG. 5. As shown, clutch member 20 in the flange of the spool may comprise four radial webs spaced 90° apart in the recess and extending a short distance into the recess. Clutch member or key 16 and the shaft 19 to which it is attached are normally spring pressed into driving engagement with the clutch member in the take-up spool flange by a spring 22 and must be retracted in order to remove the take-up spool from the camera as will be fully described hereinafter. The drive gear may be rotated in any suitable manner to rotate the take-up spool and advance the film, i.e., by a winding knob, oscillatable winding lever, etc., but in the preferred embodiment of the invention, a spring motor drive is provided which will be fully described hereinafter.

The film metering mechanism of the present invention will be described first because an understanding of the operation of the film transport mechanism with which it is combined requires an understanding of the operation thereof. In general, this metering mechanism includes a sensing pawl which senses the single perforation per picture found in the film F. Information resulting from movement of this pawl entering a film perforation is transferred to a locking lever which interrupts the rotation of a governor shaft assembly which, in turn, stops the rotation imparted to the take-up spool by the film advancing mechanism.

Referring to FIG. 2, the metering mechanism is shown in the position wherein the pawl end 25 of the sensing lever 26 pivoted at 27 is moved into engagement with one of the film perforations P by a spring 28 normally acting upon the sensing lever to move it in a clockwise direction about its pivot. In this positon a locking lever 29 normally urged in a clockwise direction about a pivot 30 by spring 31 has the vertical edge 24 of an upturned end 32 thereon moved into the path of one of three equispaced stop lugs 33 spaced equiangularily around the periphery of a three-bladed fan 34 forming a part of the governor assembly so as to lock the drive gear 18 against rotation and thereby stop the film advance. The governor assembly is provided in the present film transport and metering mechanism combination for the purpose of limiting the speed at which the film can be advanced to a value which will prevent the metering mechanism from being allowed to operate in its intended manner and thus becoming fooled. It comprises a shaft 35 to the upper end of which is attached an idler gear 36 connected to drive gear 18, in a manner to be described hereinafter, so as to be rotated at high speed along with it and provide means for limiting the speed of or stopping the rotation of said drive gear with ease. To the lower end of shaft 35 there is attached a drive disk 39 having a web 52' extending diametrically thereof which engages the ends of a pair of semicircular centrifugal weights 37 which when driven by disk 39 will fly outwardly against the rim of a stationary cup 38 to frictionally restrain the rotation of said shaft below a given speed. When the shaft 35 is stationary, this governor offers no frictional restraint to the starting of the transport mechanism, but when it reaches a given speed the weights fly out to engage the rim of the cup and a friction brake is applied to the shaft 35 and through the idler gear 36 to the drive gear 18 which drives the take-up spool. Attached to the shaft 35 is a fan member 34 which the end of the locking lever engages to stop the film advance with little difficulty.

After the film advance has been stopped upon the parts having reached the position shown in FIG. 2, the camera is ready to make an exposure of a new area of film. Upon depression of shutter release 13 the end 40 of the release lever 41 pivoted at 42 is engaged by the shutter release and is rotated in a counterclockwise direction. As the release lever 41 rotates connterclockwise its arm 44 engages an upturned lug 45 on the locking lever 29 and rotates the locking lever against the force of the spring 31 to desengage the locking lever from the fan of the governor assembly. Further depression of the shutter reelase continues to rotate the locking lever such that, just prior to the tripping of the shutter, not shown, the locking lever 29 becomes latched out of engagement with the governor assembly by the metering latch lever 46, see FIG. 3. Metering latch lever 46 is pivoted at 47 and is urged in a clockwise direction by a spring 48 connected at one end to an upstanding lug 49 on the lever and anchored at the other end to a fixed part 49' of the camera. The locking lever 29 is latched out when the extreme end 50 thereof snaps behind a hook position 51 formed near the end of lever 46, see FIG. 3. After the locking lever 29 has been latched out by the latch lever 46, the shutter release 13 continues downward to trip the shutter and make the exposure. The shutter release 13 may then be allowed to return to its normal upper rest position.

Figure 4:
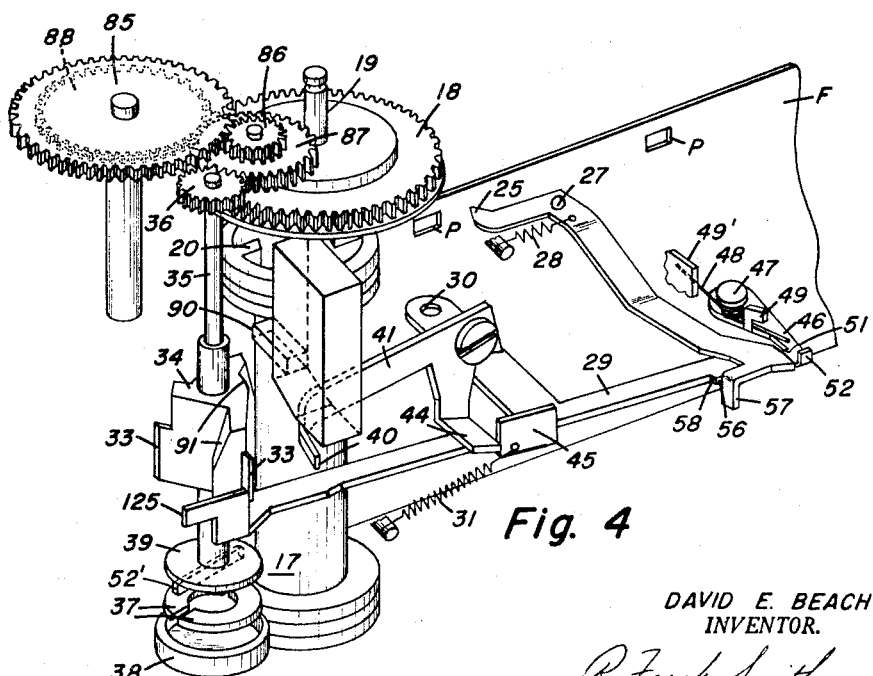

The film advance mechanism can now be again actuated and since the pawl end 25 of the sensing lever 26 is still in engagement with the film perforation at the time the film starts to advance, see FIG. 2, this pawl end will be cammed out of engagement with the perforation against the force of the spring 28 by the trailing edge of the perforation. When the sensing pawl is cammed out of the perforation, the other end 55 of the sensing lever engages an upstanding lug 52 and rotates the latch lever 46 out of engagament with end 50 of the locking lever. Because of the direction of pull of the spring 31, the end 32 of the locking lever 29 will rotate towards engagement with the fan 34 of the governor assembly. However, since the pawl end 25 of the sensing lever 26 is now riding against the surface of the film, the edge of the end 56 of locking lever 29 comes to rest against the edge of a downturned lug 57 on the end of the sensing lever and is prevented from engaging the fan of the governor assembly by a raised step 58 in the edge of the locking lever, see FIG. 4.

The metering mechanism remains in this position until the next perforation presents itself under the tip of the pawl 25 of the sensing lever. When the pawl end 25 of the sensing lever drops into the next film perforation, downturned lug 57 on the opposite end thereof drops off the raised step 58 on the locking lever 29 and permits the end 32 of the locking lever to reengage the fan 34 of the governor assembly. This prevents further rotation of the governor assembly and stops the advance of the film since the governor assembly is directly coupled through a train of gears to the film take-up spool. The next picture may then be taken by again depressing the shutter release 13.

While the take-up spool 17 can be driven by any suitable means, in the preferred embodiment of the present invention, I have provided a spring motor drive unit which will now be described. In general, the drive unit incorporates a constant tension spring motor, sometimes referred to as a negator-type spring motor, which is energized by successive pulls on a retractable tape after the film has been loaded into the camera and attached to the take-up spool. After the spring motor has been fully wound, the retractable action of the tape disengages the winding mechanism from the spring motor so that it is then free to drive film. The output of the spring motor is directly coupled, through a train of gears and the spring loaded retractable clutch, above described, to the take-up spool. The film metering mechanism, described above, in conjunction with the action of tripping the shutter, controls the stopping and release of the motor to provide automatic single frame film advance.

FIG. 5 shows the motor unit when the tape 60 extending through a slot 61 in the bottom wall 62 of the camera is being pulled to wind the motor spring 63 which runs from the storage drum 64 to the motor drum 65 when the motor is being wound and then normally returns in a reverse direction when it is unwinding and driving. Pulling tape 60 rotates the tape drum 66 and tape drum gear 67 which are connected together by a torsion spring 68. The tape drum gear 67 engages one set of teeth 69 on the drive gear 70 which also has a set of crown-type teeth 71 which, in turn, engage a pinion 72 forming a part of the motor wind clutch assembly 73. Therefore, when the tape 60 is pulled out, the motor wind clutch assembly 73 will rotate.

Figure 6:
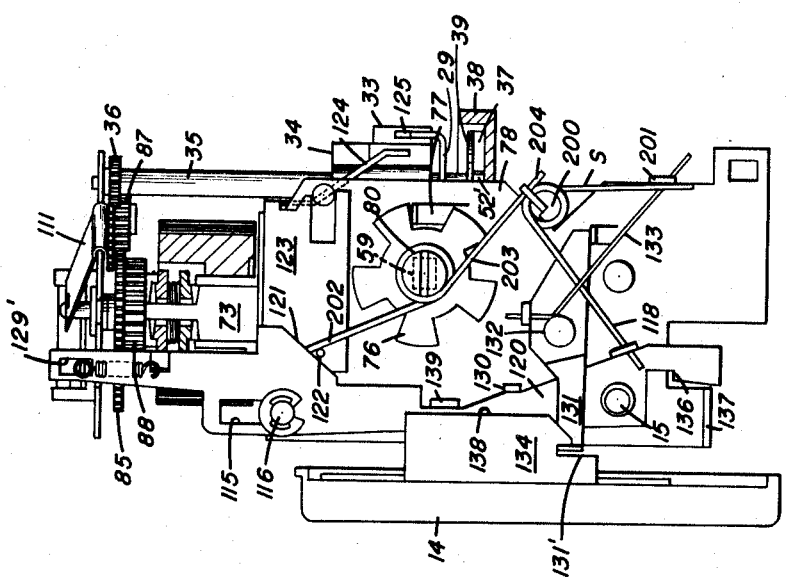

A clock-type turn spring 74 is housed within and connected at one end to the drive gear 70. The other end of the tape return spring 74 is connected to the drive gear shaft 75 which is in turn keyed at 59 to a five-bladed tape spring adjusting member 76 to prevent rotation of the shaft 75 in a clockwise direction, looking at FIGS. 6 and 7. The adjusting member 76 is prevented from rotating clockwise due to its engagement with the end of lug 77 punched out of the lower mechanism plate 78. The shape and resilience of the lug 77 along with the shape of the blades on the adjusting member 76 provides a ratchet action which permits the drive gear shaft 75 to be rotated in only one direction, counterclockwise looking at FIGS. 6 and 7. This makes it possible for the tape return spring 74 to be prewound during assembly by the use of a screwdriver engaging slotted end 80 of the shaft to provide a certain minimum returning force to the tape 60.

In the position of the parts shown in FIG. 5, the motor wind clutch assembly 73, which is rotatably and slidably mounted within bushing 81 on which the motor drum 65 rotates, is moved up into engagement with the bottom clutch 82 having diametrically opposed radial arms 83 engaging a correspondingly shaped recess 84 formed in the motor drum 65, see FIG. 8. Since the mating surfaces of the bottom clutch 82 and the motor wind clutch assembly 73 have the configuration of unidirectional face ratchets, the pair form a one-way clutch between the assembly 73 and the motor drum when they are engaged. The direction of action of this clutch is such that the bottom clutch 82 will be driven by the motor wind clutch assembly 73 when the tape 60 is pulled out, and by virtue of the connection between the radial arms on the clutch 82 with the interior of the motor drum 65 this drum will rotate and wind the motor spring 63 from the storage drum 64 when the tape is pulled out. Radial arms 83' on a top clutch 79, similar in shape to the bottom clutch 82, also engage the motor drum 65 so that, when the motor drum 65 rotates, the top clutch 79 will rotate. The top clutch 79 is spring loaded by clutch spring 54 into engagement with the end of a hub on the main drive gear 85. The mating surfaces of these two parts also contain unidirectional face ratchets and form a one-way clutch. The direction of action of this clutch is such that the main drive gear 85 will be driven by the top clutch 79 whenever the motor spring 63 unwinds. Conversely, this clutch will ratchet whenever the motor spring 63 is being wound up. FIGS. 8 and 9 show the shape and cooperation of clutches 82 and 79 with the motor drum 65.

The main drive gear 85 is coupled through stacked gears 86 and 87 to idler gear 36 fixed to the end of shaft 35 of the governor assembly described above in connection with the film metering mechanism. The rotation of the governor assembly is controlled by the metering mechanism of the camera so that during film leader wind off, between pictures, and during film trailer wind off the governor assembly is free to rotate. Whenever the metering mechanism calls for it, the locking lever 29 engages the fan 34 of the governor assembly. Since the main drive gear 85 is positively connected through the upper one-way clutch 79 to the motor spring 63 when it unwinds, the output of this spring (that is, its unwinding) can be stopped or released by the action of the camera metering mechanism.

Another gear 88 integral with the main drive gear 85 is coupled to drive gear 18, in the center of which and keyed to it, is the spool drive assembly including shaft 19 and clutch member or key 16 fixed to the end thereof which engages a companion clutch 20 in the flange of the take-up spool 17. This spool drive assembly can be retracted against the action of spring 22 to permit removal of the take-up spool from the camera, or insertion of a take-up spool into the camera, by means of a mechanism which will be described hereinafter.

As may be seen from a review of the above description, the camera metering mechanism controls the unwinding of the motor spring 63 which is coupled to the take-up spool 17. Further, because of the action of the upper one-way clutch 79, the motor spring 63 may be wound without rotating the governor assembly or the take-up spool. The metering mechanism when used in connection with a spring motor drive, rather than a manually operated drive, has to be modified in one respect. Since with a spring motor drive power will be supplied immediately to the take-up spool when the locking member 29 releases the governor assembly means must be provided to hold the governor after the shutter release 13 moves the locking member to its governor releasing position and until it moves to its shutter tripping position and returns to its normal position. Also since with the spring motor drive there is an interacting force between the fan 34 and the locking lever 29 it is necessary that the fan be momentarily backed up to relieve pressure on the metering lever 29 so that it can be readily disengaged from the fan without putting any added resistance on the movement of the shutter release. In order to accomplish these two ends, a lug 90 is attached to the backside of the shutter release 13 to engage one of the blades of a fan 34 during the early portion of the downward travel of the shutter release 13. This occurs prior to the engagement of the bottom of the shutter release with the release lever 41. This prevents the spring motor from advancing film while the shutter release is depressed. The shape of the fan blades is such that they provide a cam surface 91 which when engaged by lug 90 upon depression of the shutter release 13 will rotate the governor assembly backward slightly against the force of the motor spring 63 and thereby relieve the force of the motor spring on the locking lever 29. This permits the locking lever 29 to be easily disengaged from the fan 34 without adding an uneven force to the downward stroke of the shutter release 13.

Referring again to FIG. 5, pulling out the tape 60 will wind the spring motor by winding the motor spring 63 from the storage drum 64 onto the motor drum 65. Return of the tape 60 will permit the motor spring 63 to unwind and rotate film spool 17 if the locking lever 29 is disengaged from the fan 34 of the governor assembly. If the metering mechanism is not disengaged from the governor assembly, however, the motor spring will be prevented from unwinding in which case the return of the tape 60 will permit the lower clutch 82 to ratchet so that the motor spring may be further wound upon the next pull on the tape. Since the metering mechanism is held out of engagement with the governor assembly during the wind off of the film leader strip because of the absence of perforations in the leader strip, the film will advance whenever the tape returns to the tape drum 66.

Once the film leader has been wound off and the first picture area of the film is in exposure position, the sensing pawl 25 will have engaged a perforation in the film and the locking lever 29 will have dropped into blocking engagement with the fan 34 of the governor assembly so that the motor spring will not be able to unwind. Motor spring 63 may thereafter be wound to its limit by repeated pulls on the tape. The limit to which the motor spring may be wound is controlled by a limit pawl 95, see FIG. 8, which rides against the outer convolution of the spring on the storage drum 64 and will positively engage a radial lug 96 on the periphery of the storage drum and over which lug a hole in the end of the spring is snapped to attach this end of the spring to the drum, see FIG. 8. The limit to which the motor spring may unwind is controlled by another pivoted pawl 97 which rides on the outer convolution of the spring 63 as it is wound on the motor drum 65 and will engage a radial lug 98 extending from the periphery of the motor drum when the last convolution is reached. The two stop pawls 95 and 97 are pivoted on a common stud 99 and are urged into engagement with the outer convolutions of the spring on the respective storage drum and motor drum by opposite ends of a single spring 100 wrapped about stud 99 and engaging stamped out fingers 101 and 102 thereon.

Referring again to FIG. 5, after the first frame of film has been moved into exposure position and the motor spring 63 has been fully wound up, the tape 60 may be allowed to retract into the camera body. A grip 105, which is attached to the end of the tape, engages the clutch throw-out slide 106 when the tape 60 fully retracts into the camera. The retracting action of the tape 60 pulling upward on the grip 105 moves the clutch throw-out slide 106 upwardly. The engagement of the clutch throw-out slide 106 with the pivoted clutch throw-out lever 107 rotates this lever in a counter-clockwise direction whereupon a lug 108 on the throw-out lever will act in a downward direction against a flange 109 fixed to the end of the shaft 110 extending from the motor wind clutch assembly 73 to pull this assembly downward and disengage it from the bottom clutch 82. This separates the clutch faces of the bottom clutch 82 and the clutch assembly 73 and thus disengages the motor drum 65 from the winding mechanism. The motor drum 65 is then free to rotate and allow the motor spring to unwind whenever it is permitted to do so by the metering mechanism on the camera. A leaf spring 111 fixed at one end to the top mechanism plate 112 and having its free end 113 engaging a groove in the upper end of shaft 114 of the motor clutch assembly 73 urges the motor wind clutch assembly in an upward direction to insure that the motor wind clutch assembly will engage the bottom clutch 82 whenever the tape 60 is pulled out. The force of this leaf spring acting on the motor wind clutch assembly must be overcome by the retracting force of the tape 60 in order for the bottom clutch 82 to be disengaged.

After the last exposure has been made on the film, the metering mechanism will permit the motor to continue to rotate the take-up spool 17 until the end of the trailer, either by the presence of a special perforation or its passage beyond the sensing pawl signals the metering mechanism to stop the unwinding of the spring motor. At this time the camera back may be unlatched for removal of the exposed roll of film from the camera. It is desirable that any remaining windings in the spring motor be unwound at this time and, therefore, the action of unlatching the camera back also disengages the locking lever 29 of the metering mechanism from the fan of the governor assembly. In addition, since the take-up spool 17 cannot be removed from the camera, or a new take-up cannot be inserted into the camera, until the key drive assembly (16, 19) has been retracted from the recess in the flange of the take-up spool, the action of unlatching the camera back also performs this function. To this end, as may be seen by referring to FIGS. 6 and 7, when the latch button 15 for the camera back is depressed, it moves the latch slide 120, to which it is attached, in a downward direction. A vertical slot 115 in the latch slide 120 is held on a stud 116 of the mechanism plate 78 by a snap washer to permit this slide to move vertically of and pivot on the mechanism plate. One end 118 of a hairpin spring S wrapped around a stud 200 on a mechanism plate 78, and having its other end anchored against a lug 201 on the mechanism plate, tends to both raise the latch slide and pivot it clockwise about stud 116. When the latch slide 120 is moved downwardly, a cam surface 121 thereon engages pin 122 of the metering mechanism release slide 123 and moves said slide to the right whereupon the end of a finger 124 carried by the slide engages an extension 125 on the end of locking lever 129 and moves the locking lever out of engagement with the fan 34 of the governor assembly. One end 202 of a hairpin spring 203 wrapped around the shaft 75 and having its other end 204 anchored by a lug on the mechanism plate 78 tends to slide the mechanism release slide 123 to the left, see FIGS. 6 and 7. Thus the metering mechanism frees the governor assembly and permits any windings remaining in the spring motor to unwind when latch slide 120 is moved downwardly.

Moving the latch slide 120 in a downward direction also rotates the clutch lift lever 126 (see FIG. 5) in a counterclockwise direction about its fulcrum 127 so that the take-up spool clutch assembly (16, 19) is retracted from the take-up spool 17. The connection between the clutch lift lever 126 and the latch slide 120 comprises a tension spring 128 the lower end of which is attached to a lug 19 on the slide 120 and the other end of which is attached to the end 129 of the clutch lift lever 126 which extends through a slot 129' in the slide. By virtue of this connection, the first part of the downward movement of slide 120 pulls on the lever through the tension spring to lift the clutch assembly of the take-up spool, and only after the slide 120 has extended the spring a certain amount will the end of the slot 129' in the slide be reached so that it will directly engage the lift lever. This connection allows for a comparatively large movement of the latch slide 120 as compared to a limited movement of the lift lever 126 and thereby provides a certain amount of tolerance between the amount the slide must move to unlatch the camera back and the amount the clutch assembly must be raised to free the take-up spool.

Figure 7:
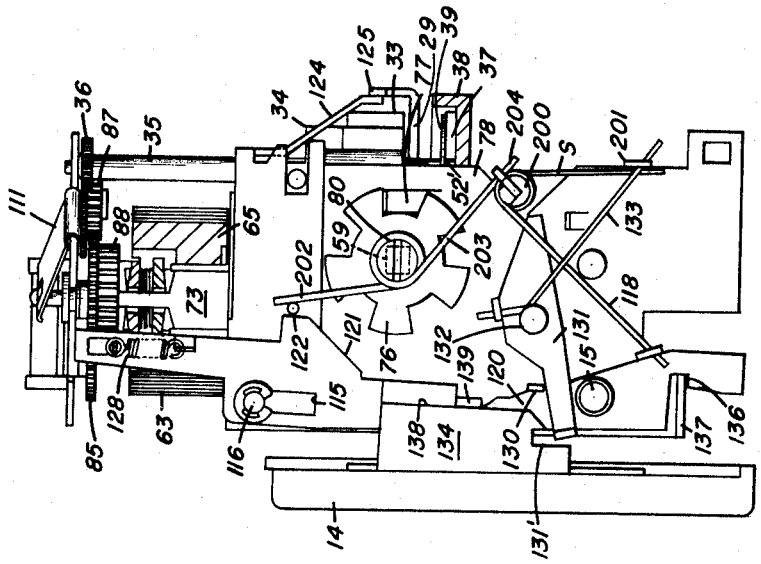
FIGS. 6 and 7 are end views of the transport mechanism shown in FIG. 5 and showing the position of the parts when the camera back is latched closed and when the camera back latch is released for opening the camera, respectively.

After the latch slide 120 has reached its unlatching point, a lug 130 thereon engages the back latch 131, see FIG. 7, and rotates it in a counterclockwise direction about pivot 132 against the force of a torsion spring 133 to disengage back latch 131 from notch 131' in the latch plate 134 on the camera back 14. The camera back may then be opened. Because of the action of the latch slide spring 118, the latch slide 120 will be prevented from returning upwardly by reason of the engagement of a hook portion 136 therein with a lug 137 turned out from the lower mechanism plate 78 due to the latch slide pivoting clockwise on stud 116, see FIG. 7. The latch slide will remain in this lowered position until the camera back is closed again at which time a surface 138 on the latch plate 134 contacting lug 139 of the latch slide 120 will dislodge the hook portion 136 of the slide from the lug 137 on the mechanism plate and allow the latch slide to return upwardly under the action of spring 118, and in so moving freeing the back latch 131 to reengage the notch 131' in the latch plate 134 on the camera back to latch it closed. Also when the latch slide 120 returns to its upper position the mechanism release slide 123 will return to its normal position (see FIG. 6) out of engagement with the locking lever 29 and the take-up spool clutch assembly (16, 19) will reengage a new take-up spool which will have been placed in the camera.

While the disengagement of the locking lever from the fan assembly is particularly useful with a spring motor driven transport mechanism to allow unwinding of the motor at the end of the exposure of a roll of film, it would also be a very useful feature in a transport mechanism which is manually operated. For example, when a new roll of film is to be put in the camera, if the locking lever 29 is not latched out of engagement with the sensing lever 26, the force of the spring 31 acting on the locking lever, as well as the force of the spring 28 acting on the sensing lever, would have to be overcome by the leader strip of backing paper associated with the roll of film and the combined effect of these two springs could very well cause the sensing pawl 25 to puncture the backing paper.

Therefore, if the locking lever 29 is positively latched out of engagement with the sensing lever when the camera back is opened, as described, or is moved to this position and held there in any other way at the time an exposed roll of film is removed from the camera, then when a new film is introduced the leader strip of backing paper need only support the spring 28 acting on the sensing pawl, which by the way may be quite light, and the spring acting on the locking lever will not have to be overcome by the backing paper.

While I have shown and described certain specific embodiments of my invention, I am aware that many modifications thereof are possible. My invention, therefore, is not to be limited to the specific structural details shown and described, but is intended to cover all modifications coming within the scope of the appended claims.

Having thus described my invention what I claim as new and desire to secure by Letters Patent of the United States is:

1. In a photographic mechanism for metering the movement of a web adapted to be driven along a predetermined plane, said web being perforated at predetermined metering intervals, the combination comprising: web driving means; a movable web sensing member normally moved from a first position contacting a surface of said web to a second position traversing said web plane when intercepting one of said web perforations; locking means movable between an operative position in which it locks said web driving means against operation, and an inoperative position wherein it frees said web driving means; means independent of said sensing member normally acting to move said locking means to said operative position; and means associating said sensing member and locking means to one another to make the movement of said locking means to its operative position responsive to movement of said sensing member from said first position to said second position.

2. In a photographic mechanism according to claim 1, in which said sensing member is mounted relative to said plane of movement of the web so as to be moved from said second position back to said first position by engagement between the trailing edge of an engaged web perforation and said sensing member when the web is advanced.

3. In a photographic camera adapted to use a film strip perforated at predetermined metering intervals and guide it across the focal plane of said camera having
 (a) a rotatable driving means,
 (b) a shutter release member movable from a normally inoperative position through a given stroke to make an exposure of an area of film in said focal plane, the improvement comprising
 (c) a sensing member normally moved from
  (1) a first position contacting a surface of said film to
  (2) a second position traversing the plane of said film when intercepting one of said perforations and back to
  (3) said first position upon movement of the film by reason of the engagement of the sensing member with said perforation.
 (d) independently energized locking means movable between
  (1) a normally operative position in which it engages and prevents rotation of said driving means to arrest movement of said film and
  (2) an inoperative position in which it releases said film driving means
 (e) means for moving said locking means to its inoperative position when said shutter release is moved from its inoperative position through its stroke to make an exposure
 (f) and means placing said locking means under control of said sensing member while it is in its inoperative position and after said sensing member is moved from said second position back to its first position to make the return movement of said locking means to its operative position responsive to movement of said sensing member from its first to its second position.

4. The combination according to claim 3 wherein said rotatable film driving means includes a take-up spool on which said film is wound up, a prime mover and a gearing connecting said prime mover to said take-up spool to rotate the same; a governor assembly connected into and driven by said gearing for limiting the speed at which said take-up spool can be rotated by said prime mover to prevent the film from being advanced along said focal plane at a rate so great as to prevent said sensing member and said locking means from metering the film advance in their intended manner.

5. The combination according to claim 3 including a spring normally acting to rotate said driving means to advance said film, and means responsive to the initial movement of said shutter release for backing up said drive means to remove the force of the spring acting thereon prior to the time said locking means is moved to its inoperative position by said shutter release when moved to make an exposure.

6. In a photographic camera adapted to use a film strip perforated at predetermined metering intervals and guide it across the focal plane of said camera having
   (a) a rotatable driving means
   (b) a shutter release member movable from a normally inoperative position through a given stroke to make an exposure of an area of film in said focal plane, the improvement comprising
   (c) a sensing member normally moved from
      (1) a first position contacting a surface of said film to
      (2) a second position traversing the plane of said film when intercepting one of said perforations and back to
      (3) said first position upon movement of said film by reason of the engagement of the sensing member with said perforation.
   (d) independently energized locking means movable between
      (1) a normally operative position in which it engages and prevents rotation of said driving means to arrest movement of said film and
      (2) an inoperative position in which it releases said film driving means
   (e) means for moving said locking means to its inoperative position when said shutter release is moved from its inoperative position through its stroke to make an exposure
   (f) means for placing said locking means under control of said sensing member while it is in its inoperative position and after said sensing member is moved from said second position back to its first position to make the return movement of said locking means to its operative position responsive to movement of said sensing member from its first to its second position, and
   (g) means for selectively moving said locking means to its inoperative position and holding it in said position while one roll of film is being removed from the camera and another is being inserted into the camera to remove the load imposed on said sensing member by said locking means during the threading operation of the camera with a new film.

7. A photographic camera according to claim 6 including
   (a) an openable back to permit unloading and loading of the camera with film,
   (b) a releasable latch for holding said back closed, and in which said last mentioned means comprises
   (c) a connection between said releasable latch and said locking means for moving said locking means to its inoperative position when said latch is operated to open said camera back and holding it in said inoperative position until said camera back is reclosed.

8. In a photographic camera adapted to use a film perforated at predetermined intervals and guide it across the focal plane of said camera having in combination
   (a) a rotatable driving member for pulling said film across said focal plane upon rotation thereof
   (b) a shutter release member movable from a normally inoperative position through a given stroke to make an exposure of an area of film in said focal plane, the improvement comprising
   (c) means for rotating said driving member including
      (1) a spring motor
      (2) a gear train coupling said spring motor to said driving member
      (3) a governor assembly driven by said gear train to limit the speed of rotation of said driving member and hence the speed of advance of said film across said focal plane
   (d) a sensing member normally moved from
      (1) a first position contacting a surface of said film to
      (2) a second position traversing said focal plane when intercepting one of said perforations and back to
      (3) said first position upon movement of the film by reason of the engagement of the sensing member with said perforation
   (e) independently energized locking means movable between
      (1) a normally operative position in which it engages and prevents rotation of one gear of said train to stop the spring motor and arrest movement of said film and
      (2) an inoperative position in which it releases said gear train to permit advance of the film
   (f) means for backing up said gear engaged by said locking means and moving said locking means to its inoperative position in that order when said shutter release is moved from its inoperative position and through its stroke to make an exposure,
   (g) means placing said locking means under control of said sensing member while it is in its inoperative position and after said sensing member is moved from said second position back to its first position to make the return movement of said locking means to its operative position responsive to movement of said sensing member from its first to its second position,
   (h) and means for selectively moving said locking means to its inoperative position after the film has been moved across said focal plane to permit said spring motor to run down.

9. The combination according to claim 8 in which said camera has an openable back and a latch for releasably holding said back in closed position; and in which said last mentioned means for selectively moving said locking means to its inoperative position includes said latch and is operated when said latch is moved to release said camera back.

10. In a photographic camera adapted to use a film strip perforated at predetermined metering intervals and having its leading end fastened to a take-up spool upon rotation of which the film strip is advanced across the focal plane of said camera and wound up upon said spool having
   (a) a rotatable clutch member adapted to drivingly engage said take-up spool
   (b) a shutter release movable from
      (1) a normally inoperative position to
      (2) an operative position to make an exposure, the improvement comprising
   (c) means for metering the advancement of successive movements of film across said focal plane and including (1) a movable film sensing member normally moved from a first position contacting a surface of said film to a second position traversing said film plane when intercepting one of said film perforations;

(2) independently energized locking means movable from an inoperative position to an operative position and responsive to movement of said sensing member for preventing the rotation of said take-up spool to arrest movement of said film upon movement of said sensing member from said first position to said second position (d) means responsive to movement of said shutter release making an exposure for moving said interlocking means from its operative position to its inoperative position (e) means for driving said clutch including
(1) a spring motor
(2) a gear train connecting said motor to said clutch and one member of which train is adapted to be engaged and prevented from rotation in response to said interlocking means moving to its operative position.

(f) means for winding said spring motor including
(1) a retractable winding member movable between an extended and retracted positions
(2) a coupling between said winding member and said spring motor for winding said spring motor when said winding member is moved toward its extended position and allowing said motor to unwind and advance the film during movement of said winding member to said retracted position until said gear train is locked in response to said sensing member engaging a perforation in said film after which further oscillations of said winding member between its two positions will only windup the spring motor, and (g) means operated by the full retraction of said winding member for disconnecting said spring motor winding means from said spring motor.

11. The combination according to claim 10 in which said retractable winding member comprises a pull tape carried on a spring return drum, and said coupling between said winding member and spring motor includes a disengageable clutch; and means actuated by full retraction of said pull tape for disengaging said clutch to uncouple the pull tape from said spring motor.

12. In a photographic camera adapted to use a film strip perforated at predetermined metering intervals and guide it along a predetermined path, the combination of
(a) means for advancing said film strip along said path
(b) a sensing member normally moved from
(1) a first position contacting a surface of said film to
(2) a second position traversing said film path when intercepting one of said perforations and back to
(3) said first position upon movement of the film by reason of the engagement of the sensing member with said perforation
(c) independently energized locking means movable to and from a normal operative position wherein it locks said film advancing means against operation, and
(d) means associating said sensing member and said locking means for making the movement of said locking means to said normal operative position dependent upon and responsive to movement of said sensing member from said first to said second position.

13. The combination according to claim 12, in which said last-mentioned means includes a releasable latch for positively holding said locking means away from said operative position to free said film advancing means when it is moved from said operative position in response to the making of an exposure; and means responsive to movement of said sensing member from said second to said first position for releasing said latch and holding said locking means away from said operative position by said sensing member.

References Cited by the Examiner
UNITED STATES PATENTS

| | | | |
|---|---|---|---|
| 1,997,332 | 4/35 | Green | 95—31 |
| 2,275,791 | 3/42 | Mihalyi | 95—31 |
| 2,728,281 | 12/55 | Mihalyi | 95—31 |

EVON C. BLUNK, *Primary Examiner.*